INVENTOR:
GEORGE J. CHAFARIS,

BY [signature]

HIS ATTORNEY.

INVENTOR:
GEORGE J. CHAFARIS,
BY Marvin A. Goldenberg
HIS ATTORNEY.

INVENTOR:
GEORGE J. CHAFARIS,
BY Marvin L. Goldenberg
HIS ATTORNEY.

3,239,840

RECORDING METHOD AND APPARATUS EMPLOYING A DEFORMABLE RECORDING MEDIUM

George J. Chafaris, Fayetteville, N.Y., assignor to General Electric Company, a corporation of New York Filed Dec. 28, 1961, Ser. No. 162,821
12 Claims. (Cl. 346—74)

The present invention relates to a novel method and apparatus for recording information on a physically deformable recording medium, and more particularly relates to the transferral of a two dimensional image formed on a first surface as an electrostatic charge pattern to the surface of the deformable medium. The invention is directed principally to deformable recording media such as thermoplastic tape or oil film, and to the recording of an image thereon without a vacuum requirement. The term "recording" is employed herein in the conttext of denoting the impressing of information for subsequent reproduction, and is not necessarily intended to signify any appreciable preservation of the information.

In conventional thermoplastic and oil film recording systems information is recorded on the deformable recording medium in the form of surface deformations. The information is normally applied to the surface of the deformable recording medium in the form of a differential electrical charge so as to form an electrostatic image or charge pattern thereon. The compressive surface forces created by the charge pattern deform the oil film in accordance with the input information. In thermoplastic recording systems, the thermoplastic member must be softened, normally by heating, before the compressive surface forces can deform the member. The information can then be permanently stored by allowing the thermoplastic to cool. The recorded information in each system can be read out by means of an optical phase demodulation projection system, commonly termed a schlieren system, which responds to diffracted light projected through the deformed recording medium.

The input information may be applied to the surface of the recording medium by the electron beam of a modified cathode ray tube which is scanned over the vacuum enclosed medium to deposit charge in a differential manner in accordance with the input information. In a more recently developed thermoplastic recording system, charge may be deposited without the requirement of a vacuum by forming the information bearing electrical charge pattern on a two dimensional surface and then transferring the charge pattern to the surface of the thermoplastic member. The surface upon which the differential charge pattern is first formed may be that of a photoconductive material, the elemental resistivity of which is responsive to a light information input. Although this latter type of recording process offers a number of advantages, such as simplicity of equipment as well as the direct and expeditious recording of a light image, the physical transfer of a charge pattern to the thermoplastic recording medium has been somewhat difficult to adequately control. Also, as is true with electron beam writing, some noise is prevalent in the recorded information due to the presence of surface charge on the recording medium. In addition, the bombardment of the thermoplastic tape surface during the transfer process limits tape re-usability. This is also true of electron beam writing.

It would thus be desirable to effect the same forces on the thermoplastic surface and on the oil film as are provided by a differential charge pattern which deform the surface in accordance with a light information input, but which do not require a transfer of electrical charge.

Accordingly, it is a principal object of the invention to provide an improved method and apparatus for recording information on a physically deformable recording medium.

It is a further object of the invention to provide such recording without the requirement of enclosing the recording medium in a vacuum.

Another object of the invention is to provide an improved method and apparatus for transferring the image of an electrostatic charge pattern to the surface of a physically deformable recording medium without requiring an actual transfer of electrical charge.

A further object of the invention is to provide an improved method and apparatus for recording information on a physically deformable recording medium which essentially eliminates a noisy condition of the recorded information due to surface charge on the recording medium.

Another object of the invention is to provide a novel method and apparatus for transferring the image of an electrostatic charge pattern to the surface of a physically deformable recording medium without the application of an electrical charge to said surface.

A still further object of the present invention is to provide an improved method and apparatus for recording information on a physically deformable re-usable recording medium which extends the re-usability character of said medium.

Briefly, in accordance with one aspect of the invention an electrostatic charge pattern is first obtained on a two dimensional surface in accordance with an input information and this surface is positioned close to the uniformly charged surface of a physically deformable recording medium so that the electric field forces in existence provide a deformation of the recording medium corresponding to said input information. More particularly this may be done by employing a photoconductor having a uniform electrical charge applied to the surface thereof, for example by a corona discharge process, and then differentially discharging portions of the surface through the photoconductor upon exposure to a light information input, the light input selectively modifying the resistivity of elemental portions of the photoconductor. The surface of the deformable recording medium may then be uniformly charged by a corona discharge and the differentially discharged photoconductor surface and the uniformly charged recording medium surface spaced close together in a parallel facing relationship. This process may be performed at atmospheric pressure, or in a partially pressurized or partially evacuated atmosphere. The spacing, charge density and pressure should be appropriate to cause an appreciable force to be exerted on the surface of the recording medium by the electrical fields created by the surface charge, and yet be such as not to cause breakdown of the gap between the photoconductor and recording medium. The recording medium, if it be in a normally softened condition, such as an oil film, responds to the surface forces and is deformed in accordance with the electrostatic charge pattern on the photoconductor. A thermoplastic recording medium requires the application of heat for softening of said medium to thereby allow deformation to occur, the thermoplastic subsequently being allowed to cool for permanent storage of the information.

In accordance with another aspect of the invention, the recording medium is deformed without having a uniform charge applied to its surface. In similar manner to that previously described, the differentially charged surface of the photoconductor is closely spaced to the now uncharged surface of the recording medium, thereby polarizing the medium, and the forces provided by the existing electric fields deform the surface of the recording medium. In this embodiment of the invention, under otherwise similar conditions, the forces will not be as great as in the previous embodiment. However, accrued advantages are that the process is considerably simplified and noise attributable to surface charge on the recording medium is essentially eliminated.

In accordance with a further object of the invention, the photoconductor can be exposed by a fiber optic cathode ray tube, the photoconductor forming a layer on the face plate of the tube. An electrostatic image is thereby formed on the surface of the photoconductor in accordance with the electrical signal applied to the tube, and is impressed on the surface of the closely spaced recording medium in the manner described above.

While the specification concludes with claims particularly pointing out and distinctly claiming the subject matter which is regarded as the invention, it is believed that the invention will be better understood from the following description taken in connection with the accompanying drawings in which:

Figure 1:
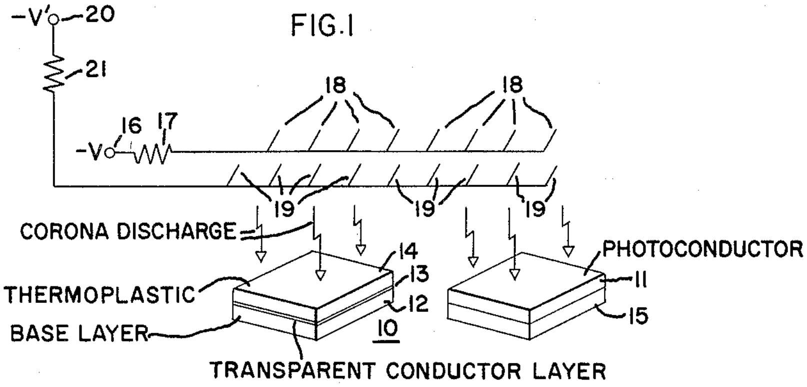
FIGURE 1 is a perspective diagram illustrating the initial phase of one embodiment of the invention.
Figures 2, 3:
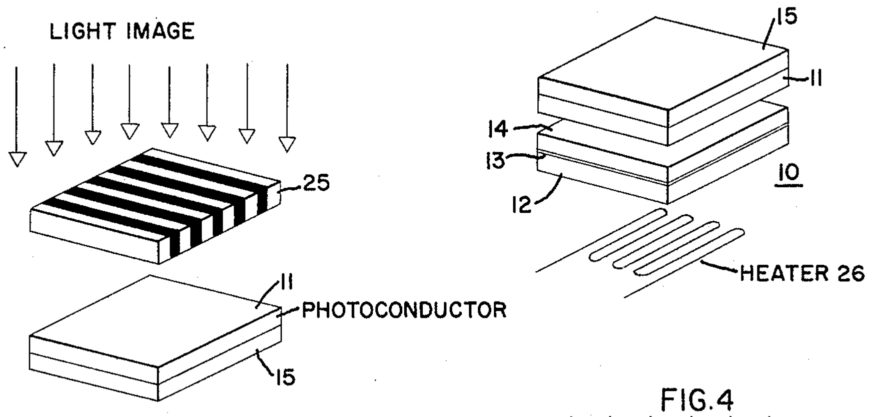
FIGURE 2 is a perspective diagram illustrating the second phase of said one embodiment of the invention.
FIGURE 3 is a perspective diagram illustrating the third phase of said one embodiment of the invention.

Referring now to FIGURES 1, 2 and 3 of the drawing, there is illustrated in sequence the steps employed in one embodiment of the invention in which a direct light image is recorded in the form of surface deformations on a uniformly charged physically deformable recording medium such as a thermoplastic tape or an oil film. In the schematic illustration of FIGURES 1, 2 and 3, the recording medium may be considered to be a thermoplastic tape 10 and the electrostatic image formed on a photoconductor member 11. The thermoplastic tape 10 may include a transparent base layer 12 of motion picture film stock approximately 1 to 4 mils in thickness, a transparent conducting layer 13, and a transparent thermoplastic layer 14 such as PS–2 hyperclean polystyrene, the number 2 indicating the molecular weight, approximately 10 microns in thickness. The photoconductor member 11 may be, for example, a p-type selenium material or n-type cadmium sulphide material, normally in excess of a 1 mil thickness. It is supported by a conductive base 15. The electrostatic image may be formed on other than photoconductive surfaces, such as on a metallic grid which may include conductive strips in various configurations.

In the first step of the recording process, shown in FIGURE 1, the upper surfaces of the thermoplastic tape 10 and the photoconductor 11 are provided with a uniform negative surface charge, presuming a p-type photoconductor. The charging may be accomplished by a corona discharge process wherein a D.C. energizing voltage —V, appearing at input terminal 16 is applied through a current limiting resistance 17 to an array of corona wires 18. The energizing voltage —V may be on the order of —10,000 volts. A corona discharge occurs between the corona wires and the surfaces of the thermoplastic layer 14 and the photoconductor member 11 to deposit a uniform surface charge thereon. The ions of the corona discharge are accelerated by means of a wire electrode array 19 disposed between the corona wires 18 and the charged surfaces of the thermoplastic tape 10 and photoconductor 11, respectively. The accelerating array 19 is energized from a source of D.C. energizing voltage V′, of a value on the order of —600 volts, applied at a second input terminal 20 through resistor 21 to produce an electrostatic field which accelerates the ions, thereby charging the surfaces uniformly. The accelerating wire electrodes 19 also function as an arc-over protective mechanism to guard against arc-over between the corona wires 18 and the two charged surfaces.

It may be appreciated that the two surfaces, alternatively, may have a positive charge applied to each, or one surface charged positively and the other charged negatively. In addition, as will be described with respect to another embodiment of the invention, the recording medium surface can be left uncharged, a differential charge being effectively induced thereon when the recording medium is positioned close to the electrostatic image of the photoconductor.

It should also be noted that although a corona discharge provides a suitable uniform surface charge, alternative techniques may be employed for this purpose, e.g., discharge from a charge plate electrode.

Upon application of the uniform surface charge, the photoconductor 11 is exposed to a light input image, or information, to differentially discharge the surface thereof in accordance with said information as illustrated in FIGURE 2. Since the resistivity of a photoconductive material is variable in accordance with an impinging light intensity, the resistivity being high in the absence of light and relatively low in the presence of bright light, charge leaks off elemental portions of the photoconductor surface to the conductive base 15 in accordance with the light intensity at these portions. Thus, an electrostatic image is formed on the surface of the photoconductor 11 which conforms to the image of the light input.

Figure 4:
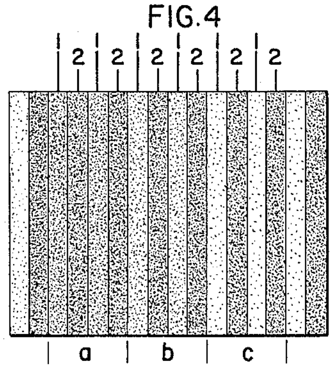
FIGURE 4 is a plan view of a differential charge pattern formed on the photoconductor member in FIGURE 2.

It is seen from FIGURE 2 that the light input is applied to the photoconductor through a bar or grid structure 25 having alternate opaque and transparent stripes. This serves to dissect the impinging light, and nence the electrical charge pattern formed thereby on the photoconductor surface, so that the image finally recorded on the thermoplastic tape 10 can be read out by a conventional optical phase demodulation projection system. Such a projection system is fully disclosed in applicant's copending application for U.S. Letters Patent Serial No. 822,097, filed June 22, 1959, entitled "Method and Apparatus for Reproducing Optical Information." Accordingly, the dissected electrical charge pattern formed on the photoconductor 11 is composed of alternate segments 1 and 2, as shown in FIGURE 4. The segments 1 have been exposed, corresponding to the transparent stripes of the grid 25, and have a point by point differential charge in accordance with the impinging light. The segments 2 are unexposed, corresponding to the opaque stripes of the grid 25, and retain maximum charge. It may be readily appreciated that the charge pattern may be broken down into various other configurations than the line charge pattern illustrated, it being necessary only that each element of the dissected charge pattern be sufficiently small to provide the desired picture resolution.

After the dissected charge pattern corresponding to the light input information is obtained on the surface of the photoconductor, this surface and the uniformly charged surface of the thermoplastic tape 10 are brought close together in a parallel facing relationship as illustrated in FIGURE 3. The surface charge on the photoconductor and thermoplastic members react so as to create forces on the thermoplastic surface which deform this surface when in a softened condition in accordance with the differential charge pattern on the photoconductor. These forces will be treated in greater detail when considering FIGURE 5. The thermoplastic layer 14 may be softened by the application of heat from a radiant heating coil 26. The spacing of the two surfaces should be such as to permit the reaction between the surface charges on the photoconductor and thermoplastic to adequately deform the thermoplastic, and yet not permit a breakdown in the gap separating the photoconductor and the thermoplastic.

Figure 5:
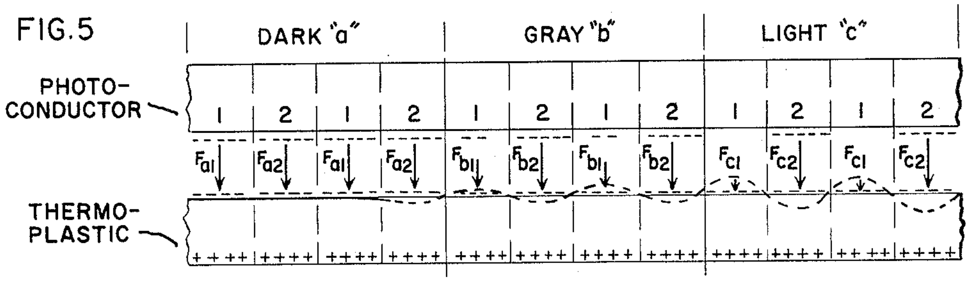
FIGURE 5 is a schematic diagram of an end view of the photoconductor and deformable recording medium in FIGURE 3, illustrating the surface charge and forces effective in obtaining deformation of the recording medium.

Referring now to FIGURE 5, there is shown graphically a representation of the surface charges and the effective forces existing between the photoconductor and thermoplastic when spaced close together as in FIGURE 3. For purposes of illustration three exemplary portions of the surfaces of the photoconductor and the thermoplastic "*a*," "*b*" and "*c*" are shown, each containing two pairs of segments 1 and 2, corresponding to the segments of the photoconductor shown in FIGURE 4. The portions "*a*," "*b*" and "*c*" are represented as dark, gray and light, respectively, dark portion "*a*" having been exposed to essentially zero light intensity, gray portion "*b*" having been exposed to an intermediate light intensity, and light portion "*c*" having been exposed to bright light intensity. The entire surface of the thermoplastic is shown as having applied thereto a uniform negative charge. The surface of segments 2 of the photoconductor have equal negative charges of essentially the same charge density as previously applied by the corona discharge. The surface of the segments 1 of the photoconductor have a differential negative charge in accordance with their relative light exposures. Each of the negative charges on the thermoplastic surface effectively induces a corresponding positive charge at the opposite surface, as shown in FIGURE 5. Thus, a composite electric field is established across the thermoplastic member and in the gap between the charged surfaces providing resultant coulomb forces which are applied to the surface of the thermoplastic. These coulomb forces are the sum of the attraction forces between the negative surface charge on the thermoplastic and the induced positive charge, and the repulsion forces between the negative surface charge on the thermoplastic and on the photoconductor. It may be appreciated that the attraction forces are uniform whereas the repulsion forces vary in accordance with the differential charge pattern on the photoconductor, providing a differential force pattern for deforming the thermoplastic.

Thus, in portion "*a*," the forces $F_{a1}$ and $F_{a2}$ applied to the thermoplastic segments 1 and 2, respectively, are equal and there is essentially no deformation of the surface. In portion "*b*" the forces $F_{b1}$ are less than $F_{b2}$, since the diminished charge on the exposed photoconductor surface decreases the repulsion force between negative surface charges, and a deformation of the surface of portion "*b*" will occur, as shown in FIGURE 5. In portion "*c*" a still greater differential exists between the forces on segments 1 and 2, indicated by $F_{c1}$ and $F_{c2}$, and a more intense deformation of the thermoplastic surface occurs.

It is, therefore, seen that the thermoplastic surface is deformed in accordance with a light input without any physical transfer of charge taking place. In the readout operation it may be appreciated that dark portion "*a*" with minimum surface deformity will diffract a minimum of the projected light and appear dark on the screen, portion "b" with intermediate surface deformity will diffract a medium intensity light, appearing gray on the screen, and portion "*c*" will diffract maximum light and appear light on the screen.

For a condition of no charge applied to the thermoplastic surface, a positive differential charge equal and opposite to the negative differential charge on the photoconductor will effectively be induced on the thermoplastic surface, resulting from a polarization of the thermoplastic material, and the forces created will cause deformation of the thermoplastic surface in accordance with the input information.

Figure 6:
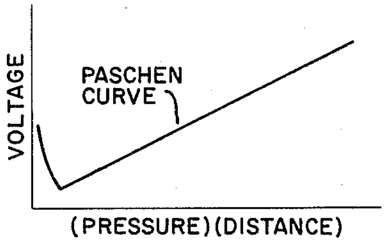
FIGURE 6 is a Paschen curve employed in describing significant characteristics of the invention.

It is desirable to have charge densities on the photoconductor and thermoplastic surfaces at sufficiently close spacing between the two surfaces so that the forces active on the thermoplastic member provide adequate resolution of the recorded information. It is essential, however, that the maximum electric field existing in the gap, the electric field E being denoted by $$E=\frac{v}{d}$$

where $v$ is the voltage across the gap and $d$ the gap distance, be less than the dielectric strength of the air atmosphere in the gap so as not to cause a breakdown or ionization of the gap and thereby produce an undesired charge transfer. The breakdown characteristics of air are shown in the Paschen curve of FIGURE 6 in which breakdown voltage $v$ is plotted versus the product of distance and pressure, $(p)(d)$. It is seen that beyond the valley point of the curve, which occurs at approximately ¼ mil at atmospheric pressure, the breakdown voltage $v$ is directly related to the product $(p)(d)$. It is also seen that for values of $(p)(d)$, below the valley point, $v$ is inversely related to $(p)(d)$. Thus, breakdown can be avoided by varying any of the three parameters, voltage, distance and pressure. Since the surface forces on the recording medium are directly related to E, and the resolution of the recorded information is directly related to $l/d$, by maintaining the product $(p)(d)$ sufficiently large so as to occur slightly beyond the valley point, e.g., a gap distance between ½–1 mil at atmospheric pressure, electric fields may be developed below breakdown which provide deformation of the recording medium at resolutions sufficient for most applications. For very high resolutions, e.g., between 50–100 lines per mm., the $(p)(d)$ product should be maintained below the valley point, e.g., with a gap distance of less than ¼ mil at atmospheric or somewhat reduced pressures.

Figure 7:
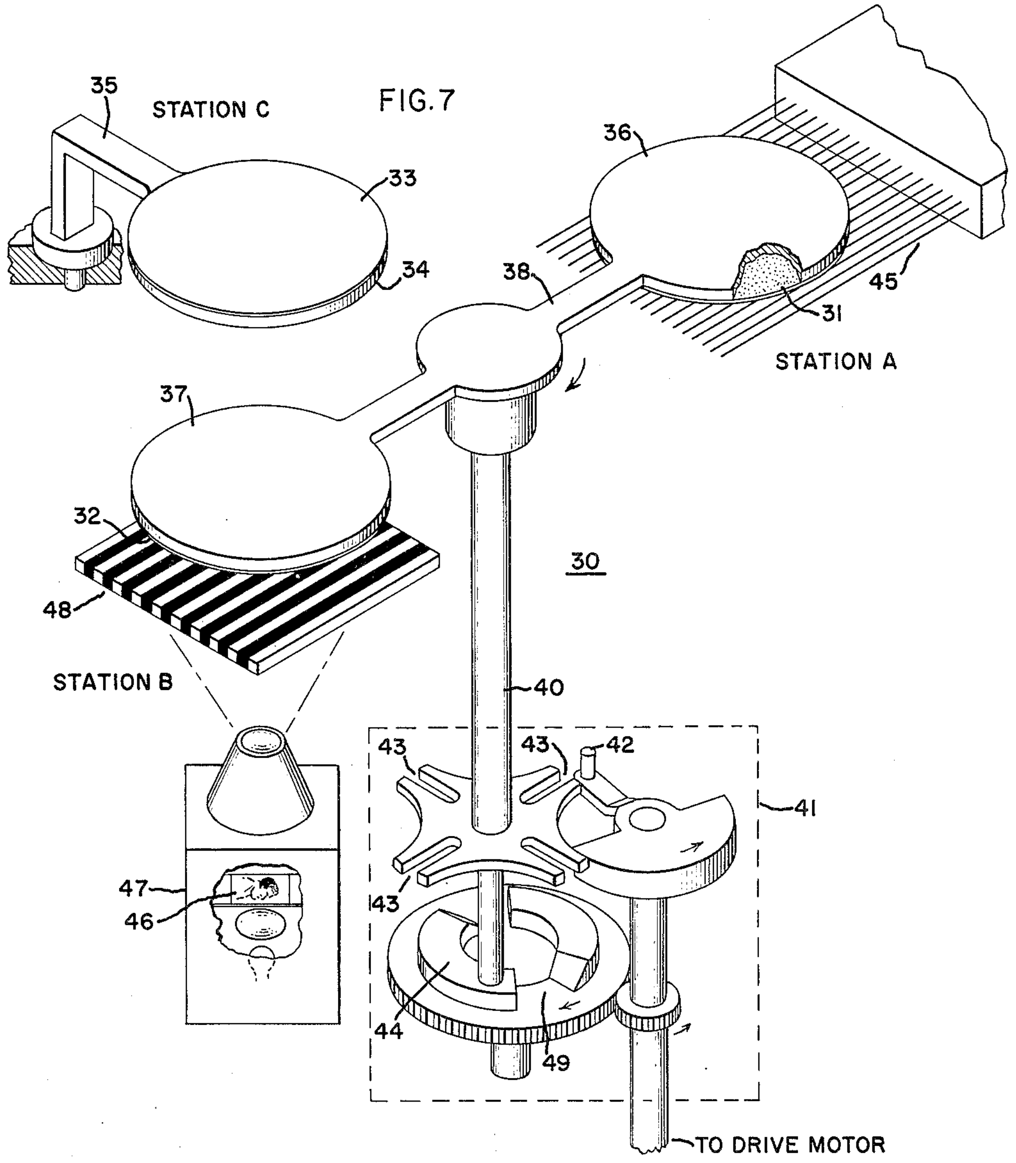
FIGURE 7 is a perspective view of a recording apparatus employed in accordance with the invention wherein a direct light input is applied.

Referring now to FIGURE 7, there is illustrated a recording apparatus 30 in accordance with the invention in which a direct light input, providing an electrostatic image on the surface of photoconductor layers 31 and 32, is recorded on the surface of a transparent oil film 33. The oil film 33 forms a thin coating, on the order of a few microns, on the upper surface of a conductive base member 34 which is joined to a support arm 35. The photoconductive layers 31 and 32 are each supported on the underside of conductive base members 36 and 37, respectively, the base members being joined by a supporting bar 38 to a central mounting shaft 40. Shaft 40 is provided for both rotatable and axial movement by a Geneva mechanism 41. The Geneva mechanism 41 provides a 90° stepped rotation of the photoconductor elements with shaft 40 by means of the engagement of pin 42 with slots 43. In addition, a slotted cam 44 provides axial movement of the photoconductor elements on alternate steps when the photoconductors are positioned over the oil film. This is to avoid distortion of the recorded image by sidewise movement of the photoconductors relative to the oil film. Thus, the shaft 40 rides on the upper surface of cam 44 when the photoconductor members are at stations A and B or are in the process of rotating, dropping into the slots 49 when the photoconductors arrive at station C and being raised to the upper surface again immediately prior to the succeeding rotational step.

Figure 8:
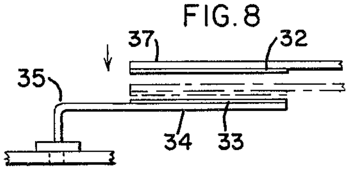
FIGURE 8 is a cross-sectional view of a portion of the apparatus of FIGURE 7 illustrating the positioning of the photoconductor relative to the recording medium during impression of the image onto the recording medium.

At station A the under surface of one of the photoconductors, shown as layer 31, is provided with a uniform electrical charge from a corona discharging device 45 in the manner previously described. At station B the uniformly charged surface, shown as that of layer 32, is exposed by a light input, which may be from a negative 46 housed in projector 47. The light input is focused through a grid structure 48 to provide a dissected electrostatic image on the photoconductor surface. At station C the differentially charged surface of the photoconductor is brought into a closely spaced parallel facing relationship with the upper surface of the oil film 33, as illustrated in FIGURE 8, and the recording made. Projection of the information recorded on the oil film may also be performed at station C by a schlieren projection system, not shown. Therefore, in the operation of the apparatus, the potoconductor disks are rotated in 90° steps from one station to the next, momentarily stopping at each station to be processed.

The apparatus of FIGURE 7 contemplates recording on an oil film without a prior uniform surface charge applied which has the advantage of extending the reusability character of the medium since the application of surface charge has been found to have a somewhat deteriorating effect on both oil and thermoplastic. Further, a noisy condition of the recording due to surface charge is essentially eliminated.

However, where greater surface forces are desired requiring a uniformly charged surface, the oil should occasionally be charged, which may be done in a manner similar to the uniform charging of the photoconductor layers. Obviously, the apparatus of FIGURE 7 can be employed for recording on thermoplastic tape. For such recording a heating device must be employed to soften the thermoplastic during the recording step.

Figure 9:
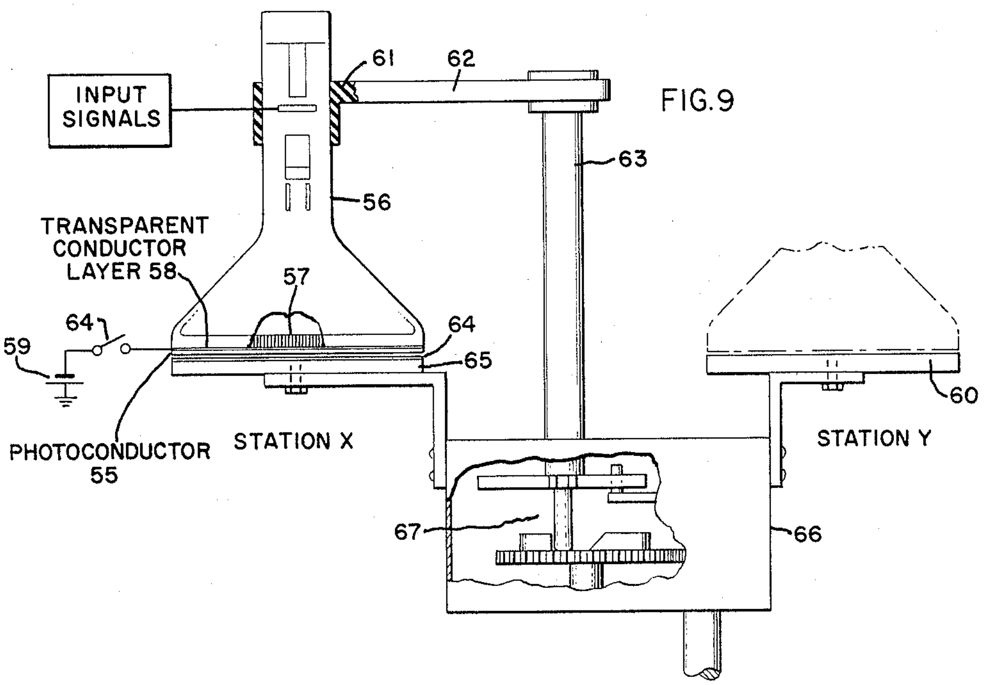
FIGURE 9 is a perspective view of a second recording apparatus employed in accordance with the invention wherein an electrical signal input is recorded by means of a fiber optic cathode ray tube.
Figure 10:
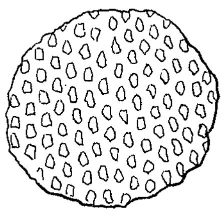
FIGURE 10 is a blown up plan view of a portion of the fiber optic faceplate surfrace of the tube in FIGURE 9.

FIGURE 9 illustrates a further embodiment of the invention in which information applied in the form of electrical signals can be recorded on deformable recording medium without requiring the medium to be vacuum enclosed. In this embodiment, the input information is formed as an electrostatic image on the surface of a photoconductor layer 55 which is deposited on the outer surface of a fiber optic cathode ray tube 56. An enlarged plan view of a portion of the tube faceplate is shown in FIGURE 10. Such tubes are described in an article entitled "Fiber Optics and Their Application to Electronic Tubes," by R. L. Stow, appearing in Electrical Design News, December 1961. A suitable fiber optic tube that may be employed is the Westinghouse WX–4510.

Tube 56 is essentially a conventional cathode ray tube in which the faceplate includes a fiber optics bundle 57 optically coupled to the tube output phosphors. A thin transparent conductive coating 58 is applied to the outer surface of the faceplate between said outer surface and the photoconductor layer 55. A source of electrical charge, shown as battery 59, is connected to conductive coating 58. A modulated electron beam is scanned over the phosphors in conventional fashion, and the light output therefrom is transmitted by the fiber optics bundle 57 to the photoconductor layer 55 to differentially alter the resistivity of its elemental portions. Charge thereby flows from source 59 through the photoconductor and a charge pattern is formed on the surface of the photoconductor in accordance with the electrical input information. The photoconductor layer may be composed of narrow alternate stripes of photoconductive and nonphotoconductive material to provide dissection of the charge pattern. A grounding plate 60 is provided for removing surface charge from the photoconductor after each recording sequence.

The tube 56 is held by a clamp 61 joined to a rigid arm 62 pivotted about a central shaft 63 which provides both rotatable and slight axial movement of the tube

56. The oil film 64 is coated on a supporting base member 65 joined to a mounting frame 66. The oil film, as in FIGURE 7, is presumed to be uncharged. The mounting frame encloses a gear arrangement 67, which may be similar to that shown in FIGURE 7, for imparting the required rotatable and axial movement to the tube. Also joined to the mounting frame is the grounding plate 60. Tube 56 oscillates between stations X and Y. At station X it is in a closely spaced facing relationship with the oil film 64, as illustrated, and the recording is made. At station Y it is positioned over the grounding plate 60 for discharging the photoconductor surface, thereby clearing it for the succeeding information sequence. During clearing it is preferable that source 59 be disconnected, which is accomplished by the opening of switch 68. As with the previously described embodiments, the charge of the electrostatic image and the spacing between the photoconductor surface and the oil film surface provide the required surface deforming forces on the oil film without causing breakdown of the gap. In addition, after the recording is made the surfaces are separated sufficiently so that no differential surface forces exist during the portion of the operation when the tube is in rotation. The deformed oil film is read out by a schlieren projector, not shown, when the tube 56 is at station Y. The viscosity of the oil retains the deformation of the oil surface long enough to allow retrieval of the stored information.

Although the invention has been described with respect to a few specific embodiments for a complete disclosure thereof, it is not intended to be so limited and numerous modifications may occur to those skilled in the art which are within the teachings herein set forth. Thus, the information bearing charge patterns may be formed on the surface of the photoconductor members by still other processes than those described. For example, a D.C. voltage source may be applied to the conductive base of the photoconductor members during exposure to a light input information and the surface differentially charged in this manner. In addition, other dielectrics, such as a gaseous medium, may fill the gap between the photoconductor and the recording member. In addition, for some applications it may be desirable to coat the photoconductor surface with a layer of dielectric, such as Teflon, for modifying the dielectric characteristics between the photoconductor and the recording member.

The appended claims are intended to be construed as embodying the above and all modifications that fall within the true scope and spirit of the invention.

What I claim as new and desire to secure by Letters Patent of the United States is:

1. A method of recording information on the surface of a physically deformable recording medium comprising the steps of:
   (a) forming an electrostatic image on a first surface in accordance with said information,
   (b) positioning said first surface in a facing relationship with the surface of said deformable medium with a dielectric medium separating the two surfaces, and
   (c) creating an electric field between said two surfaces having a maximum value less than the dielectric strength of said dielectric medium so as to provide coulomb forces which deform the surface of the deformable medium in conformance with said electrostatic image.

2. A method of recording information on the surface of a physically deformable recording medium comprising the steps of:
   (a) forming an electrostatic image on a first surface in accordance with said information,
   (b) applying a uniform electrical charge to the surface of said deformable medium,
   (c) positioning said first surface in a facing relationship with the surface of said deformable medium with a dielectric medium separating the two surfaces, and
   (d) creating an electric field between the two surfaces having a maximum value less than the dielectric strength of said dielectric medium so as to provide coulomb forces which deform the surface of the deformable medium in conformity with said electrostatic image.

3. A method of recording light information on the surface of a physically deformable recording medium comprising the steps of:

(a) applying a uniform electrical charge to the surface of a photosensitive member,
(b) exposing said photosensitive member to said light information to differentially alter the resistivity of elemental portions of said member, thereby differentially discharging the photosensitive member surface and providing an electrostatic image thereon in accordance with said light information,
(c) positioning the surface of said photosensitive member in a facing relationship with the surface of said deformable medium with a dielectric medium separating the two surfaces, and
(d) creating an electric field between said two surfaces having a maximum value less than the dielectric strength of said dielectric medium so as to provide coulomb forces which deform the surface of the deformable medium in conformity with said electrostatic image.

4. An apparatus for recording information on the surface of a softenable solid deformable recording medium comprising:

(a) means for applying an electrical charge pattern to a first surface to form an electrostatic image thereon in accordance with said information,
(b) means to position said first surface in a parallel facing relationship with the surface of said deformable medium with a dielectric medium separating the two surfaces and arranged so as to create an electric field between said two surfaces having a maximum value less than the dielectric strength of said dielectric medium, which field exerts coulomb forces on the surface of said deformable medium in accordance with said electrostatic image, and
(c) means for softening said recording medium, said coulomb forces thereby acting to deform the surface of said softened recording medium in conformity with said information, said recording medium being subsequently restored to its solid state so as to permanently retain the deformations therein.

5. An apparatus as in claim 4 wherein said softenable solid deformable recording medium comprises a thermoplastic member.

6. An apparatus as in claim 5 wherein said first surface is the surface of a photoconductor member.

7. An apparatus for recording information on the surface of a softenable solid deformable recording medium comprising:

(a) means for applying an electrical charge pattern to a first surface to form an electrostatic image thereon in accordance with said information,
(b) means for applying a uniform electrical charge to the surface of said deformable recording medium,
(c) means for positioning said first surface in a parallel facing relationship with the surface of said softened deformable medium with a dielectric medium separating the two surfaces and arranged so as to create an electric field between the two surfaces having a maximum value less than the dielectric strength of said dielectric medium, which field exerts coulomb forces on the surface of said deformable medium in accordance with said electrostatic image, and
(d) means for softening said recording medium, said coulomb forces thereby acting to deform the surface of said softened recording medium in conformity with said information, said recording medium being subseqeuntly restored to its solid state so as to permanently retain the deformations therein.

8. An apparatus for recording information on the surface of a thermoplastic recording medium comprising:

(a) a photoconductor member,
(b) means for applying an electrical charge pattern to the surface of said photoconductor to form an electrostatic image thereon in accordance with said information,
(c) means for applying a uniform electrical charge to the surface of said thermoplastic recording medium,
(d) means for positioning the charged surfaces of said photoconductor and said thermoplastic medium in a parallel facing relationship with a dielectric medium separating the two surfaces and arranged so as to create an electrical field between said surfaces having a maximum value less than the dielectric strength of the dielectric medium, which field exerts coulomb forces on the surface of said thermoplastic in accordance with said electrostatic image, and
(e) means for heating said thermoplastic medium so as to soften it, said coulomb forces thereby acting to deform the surface of said softened thermoplastic in conformity with said information, said thermoplastic medium being subsequently cooled and the surface deformations stored therein.

9. Apparatus for recording information on the surface of an oil film comprising:

(a) means for applying an electrical charge pattern to a first surface to form an electrostatic image thereon in accordance with said information,
(b) means for positioning said first surface in a parallel facing relationship with the surface of said oil film with a dielectric medium separating the two surfaces and arranged so as to create an electric field between the two surfaces having a maximum value less than the dielectric strength of said dielectric medium, said field providing coulomb forces which deform the surface of said oil film in conformity with said electrostatic image.

10. Apparatus as in claim 9 wherein said first surface is the surface of a photoconductor member.

11. Apparatus for recording information on the surface of an oil film comprising:

(a) a photoconductor member,
(b) means for applying an electrical charge pattern to the surface of said photoconductor to form an electrostatic image thereon in accordance with said information,
(c) means for applying a uniform electrical charge to the surface of said oil film, and
(d) means for positioning the charged surfaces of said photoconductor and said oil film in a parallel facing relationship with a dielectric medium separating the two surfaces and arranged so as to create an electric field between the two surfaces having a maximum value less than the dielectric strength of said dielectric medium, said field providing coulomb forces which deform the surface of said oil film in conformity with said electrostatic image.

12. Apparatus for recording electrical information on the surface of a physically deformable recording medium comprising:

(a) a fiber optic cathode ray tube in which is generated an electron beam, said tube having a transparent conductive layer coated on the outer surface of the tube faceplate and a photoconductive layer overlaying said conductive layer,
(b) means for applying said electrical information to modulate said electron beam for varying the resistivity of elemental portions of said photoconductive layer,
(c) a source of electrical charge coupled to said conductive layer, the charge from said source being conducted through the differentially resistive photoconductive layer to provide an electrostatic charge pattern on the surface of said photoconductive layer in accordance with said information, and (d) means for positioning the charged surface of said photoconductive layer in a parallel facing relationship with the surface of said deformable medium with a dielectric medium separating the two surfaces and arranged so as to create an electric field between the two surfaces having a maximum value less than the dielectric strength of said medium, said field providing coulomb forces which deform the surface of said deformable medium in conformity with said charge pattern.

References Cited by the Examiner

UNITED STATES PATENTS

| | | | |
|---|---|---|---|
| 2,898,468 | 8/1959 | McNaney | 250—49.5 |
| 3,007,049 | 10/1961 | McNaney | 250—49.5 |
| 3,158,430 | 11/1964 | McNaney | 346—77 |

IRVING L. SRAGOW, *Primary Examiner.*

ARTHUR GAUSS, *Examiner.*

S. CHATMON, M. KIRK, H. D. VOLK, *Assistant Examiners.*